(12) United States Patent
Shotton et al.

(10) Patent No.: US 11,806,203 B2
(45) Date of Patent: Nov. 7, 2023

(54) SYRINGE DISPENSER

(71) Applicant: DENTSPLY SIRONA Inc., York, PA (US)

(72) Inventors: Vincent Shotton, Broken Arrow, OK (US); Kevin Wilkinson, Bixby, OK (US)

(73) Assignee: DENTSPLY SIRONA INC., York, PA (US)

( * ) Notice: Subject to any disclaimer, the term of this patent is extended or adjusted under 35 U.S.C. 154(b) by 94 days.

(21) Appl. No.: 17/130,057

(22) Filed: Dec. 22, 2020

(65) Prior Publication Data

US 2021/0106411 A1 Apr. 15, 2021

Related U.S. Application Data

(63) Continuation of application No. 16/174,327, filed on Oct. 30, 2018, now abandoned.

(51) Int. Cl.
*A61C 17/02* (2006.01)
*A61C 5/50* (2017.01)
*A61C 1/00* (2006.01)

(52) U.S. Cl.
CPC ........ *A61C 17/0202* (2013.01); *A61C 1/0023* (2013.01); *A61C 5/50* (2017.02)

(58) Field of Classification Search
CPC ..... A61C 17/0202; A61C 1/0023; A61C 5/50; A61C 17/02; A61M 5/142; A61M 5/145; A61M 5/1456; A61M 5/14566; A61M 5/14212; A61M 5/1452
See application file for complete search history.

(56) References Cited

U.S. PATENT DOCUMENTS

| | | | |
|---|---|---|---|
| 3,764,115 A | 10/1973 | Buckingham et al. | |
| 4,108,177 A | 8/1978 | Pistor | |
| 4,685,903 A * | 8/1987 | Cable ................. | A61M 5/1456 417/44.1 |
| 5,006,112 A | 4/1991 | Metzner | |
| 5,505,709 A * | 4/1996 | Funderburk ........ | A61M 5/1456 604/151 |
| 5,876,380 A | 3/1999 | Manganini et al. | |
| 6,932,242 B2 | 8/2005 | Gerlach et al. | |
| 2003/0009133 A1* | 1/2003 | Ramey ................ | A61M 5/1456 604/154 |
| 2005/0153258 A1* | 7/2005 | McCoy ................... | A61C 5/62 433/81 |
| 2007/0063603 A1* | 3/2007 | Levine ................ | D06F 37/206 310/85 |

(Continued)

FOREIGN PATENT DOCUMENTS

| | | |
|---|---|---|
| EP | 0909590 A2 | 4/1999 |
| EP | 1072232 A2 | 1/2001 |

(Continued)

*Primary Examiner* — Katherine H Schwiker
*Assistant Examiner* — Rachel T. Smith
(74) *Attorney, Agent, or Firm* — DENTSPLY SIRONA INC.

(57) ABSTRACT

A motor driven syringe dispenser which has a syringe mounting part, a slider, and a connection for an endodontic motor. The syringe dispenser connects to an endodontic motor which is used to drive a plunger of a syringe placed in the syringe mounting part thereby expressing irrigant into a root canal for root canal therapy.

10 Claims, 13 Drawing Sheets

(56) References Cited

U.S. PATENT DOCUMENTS

| | | |
|---|---|---|
| 2010/0063447 A1 | 3/2010 | Stempfle et al. |
| 2015/0157802 A1 | 6/2015 | Yoon |
| 2018/0271617 A1* | 9/2018 | Feldman .............. A61C 17/221 |

FOREIGN PATENT DOCUMENTS

| | | |
|---|---|---|
| JP | H0718861 Y2 * | 1/1995 |
| KR | 200480998 | 8/2016 |

\* cited by examiner

SYRINGE DISPENSER

FIELD OF THE INVENTION

The present application generally relates to a syringe dispenser, and, more particularly, to a motor driven syringe dispenser comprising a syringe mounting part, a slider, and a connection for an endodontic motor wherein the syringe dispenser drives a syringe connected to an irrigation needle to express irrigant into a root canal for root canal therapy.

BACKGROUND OF THE INVENTION

Endodontic treatment is important when pulp, which is the soft tissue inside a root canal, becomes inflamed or infected. The inflammation or infection can be caused by deep decay, repeated dental procedures on the tooth or a crack or chip in the tooth. Irrigation has a central role in endodontic treatment. During and after instrumentation, the irrigants facilitate removal of microorganisms, tissue remnants, and dentin chips from the root canal through a flushing mechanism.

In endodontics, irrigation may take place by a clinician by placing an irrigant (e.g. NaOCl, EDTA, Qmix, etc.) in a syringe which may then be connected to an irrigation needle via a luer lock connection. The clinician may then depress a plunger of the syringe within the barrel of the syringe manually, in so doing, causing the irrigant to extrude from an irrigation needle within the root canal. The rate at which the plunger is displaced within the barrel of the syringe may depend on many factors including, for example, the strength of the user (i.e. how fast/hard they can depress the plunger), the size of the irrigation needle (the smaller the opening of the needle, the more difficult it may be to express the irrigant), the size of the syringe (i.e. the volume amount it can hold and how easy or difficult it is to hold and express the irrigant), and the amount of resistance/back pressure of the irrigant or material in the root canal. Typically, the larger the syringe, the more difficult it is to express the irrigant at a relatively high flow rate. The higher the flow rate (i.e. the faster the syringe is depressed), the higher the velocity and pressure of the irrigant being expressed from the needle. This increased velocity and pressure may increase the shear wall stress and the cleaning ability of the irrigant within the canal.

U.S. Pat. No. 5,876,380A discloses a portable syringe dispenser system that may hold one or more syringes containing different types of fluid medicine therein. Filled syringes, holding enough fluid medicine for multiple injections, may be placed into syringe holders in the dispenser and inserted into a sterile mixing chamber. The dosage of each type of fluid medicine in each syringe may be independently adjusted employing a dose adjusting indicator system and an activation system may allow all doses of the fluid medicine to be simultaneously injected through a replaceable sterile needle.

U.S. Pat. No. 6,932,242B2 discloses a syringe pump comprising a housing presenting a syringe trough for a syringe to be placed therein, an operating panel and a drive head for moving a plunger of the syringe, the drive head being movable linearly with respect to the housing.

U.S. Pat. No. 5,006,112A discloses a syringe pump for controlled dosage dispensing of a liquid from an injection syringe that has a casing with a mounting, the syringe pump being driven by a motor and using a screw spindle transmission to convey the force from the motor to the piston. The device includes a drive element which is fastened to a pushing component that presses against the bottom plate of the syringe piston.

These syringe pumps may be powered either by an AC plug connected to a mains connection or by a battery. However since motors are usually expensive components of syringe pumps, it may be helpful to use existing endodontic motors to control a syringe dispenser wherein a clinician may use, for example, a foot pedal or push button from the endodontic motor to start/stop the dispenser.

SUMMARY OF THE INVENTION

Existing limitations associated with the foregoing, as well as other limitations, may be overcome by a motor driven syringe dispenser comprising a syringe mounting part, a slider, and a connection for an endodontic motor wherein the syringe dispenser drives a syringe having an irrigation needle to express irrigant into a root canal for root canal therapy. Herein an endodontic motor (e.g, a standard endodontic motor) may be used to control the syringe dispenser wherein a clinician may use, for example, a foot pedal or push button of the endodontic motor to start/stop the pump. Settings on the motor may control the speed of the motor which in turn may control the speed of depressing a syringe inserted in the syringe dispenser and the flow rate of the irrigant exiting the irrigation needle. Torque control on the motor may be configured to stop the syringe pump. Pre-programmed settings on the endodontic motor may define these input settings to maximize an output of the syringe dispenser. Alternatively, a battery powered syringe dispenser may be used without the endodontic motor to drive the syringe dispenser, wherein the battery powered syringe dispenser may be configured to be hand-held and may have buttons to control a DC powered motor that may be provided with a gear reduction mechanism.

According to an example embodiment herein, a syringe dispenser is provided for expressing an irrigant from a syringe which has a plunger movably positioned inside a barrel, the syringe dispenser comprising: an upper housing and a lower housing; a syringe mounting part disposed within the lower housing and configured to receive the barrel so that the syringe is mounted on the syringe mounting part; a slider disposed within the lower housing, the slider having a plunger receiving portion configured to receive the plunger when the syringe is mounted on the syringe mounting part, and a motor coupling disposed within the upper housing, the motor coupling configured to transfer an output of a motor to a threaded screw, wherein, the slider is connected to (i) one or more guide rods which are configured to confine a movement of the slider to a predetermined path and to (ii) said threaded screw which is configured to be operated by the motor coupling such that the slider moves forwards and backwards and creates a corresponding forwards and backwards movement of plunger in order to express the irrigant from the syringe.

According to another aspect of the present invention the device may be provided including one or more combinations of the following: (i) wherein the motor is a standard endodontic motor, (ii) wherein the upper housing and the lower housing are made from a material selected from the group consisting of polypropylene, polyethylene, nylon, polycarbonate and Acrylonitrile butadiene styrene, (iii) wherein the motor coupling includes a high gear and a low gear, the high gear being connected to the motor and the low gear being connected to the threaded screw, wherein a gear ratio between the high gear and the low gear is configured to produce a predetermined torque for depressing a plunger of the syringe, (iv) wherein a foot pedal connected to the standard endodontic motor is used to activate and/or control movement of the slider, According to yet another aspect of the present invention a battery powered handheld syringe dispenser may be provided for expressing an irrigant from a syringe which has a plunger movably positioned inside a barrel, the syringe dispenser comprising: an upper housing and a lower housing; a syringe mounting part disposed within the lower housing and configured to receive the barrel so that the syringe is mounted on the syringe mounting part; a slider disposed within the lower housing, the slider having a plunger receiving portion configured to receive the plunger when the syringe is mounted on the syringe mounting part, and a motor disposed within the upper housing, the motor coupling configured to transfer an output of said motor to a threaded screw, wherein, the slider is connected to one or more guide rods which are configured to confine a movement of the slider to a predetermined path and the slider engages said threaded screw which is configured to be operated by the motor such that the slider moves forwards and backwards and creates a corresponding forwards and backwards movement of plunger in order to express the irrigant from the syringe, and wherein the slider has a push button slide and wherein the push button slide is spring biased such that when the push button slide is depressed, the slider disengages from the threaded screw such that the slider may be moved freely.

According to yet another aspect of the present invention a battery powered handheld syringe dispenser may be provided including one or more combinations of the following: (i) further comprising a controller having a circuit configured to control the motor, (ii) wherein the controller is configured to receive a signal feedback from the motor and to stop the motor from advancing the slider when a torque on the motor exceeds a predefined limit, (iii) wherein the controller is located inside and/or outside the syringe dispenser.

The advantage to having a syringe pump control the expression of the irrigant as compared to the conventional method of the user manually expressing the irrigant with the syringe may be the ability to provide a constant and potentially higher flow rate of irrigant being delivered within the root canal. Due to fatigue by a user from expressing the irrigant manually or on account of the size of an irrigation needle being used, it may become increasingly difficult to express irrigant from the syringe. Furthermore, the flow rate of the irrigant being delivered may be dictated by how fast the syringe can be depressed. If the irrigant is expressed at a higher flow rate, the velocity and pressure of the irrigant being expressed from the irrigation needle may be increased, causing a high shear wall stress which enhances the cleaning of the root canal.

Further features and advantages, as well as the structure and operation of various embodiments herein, are described in detail below with reference to the accompanying drawings.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein and wherein.

Figure 1:
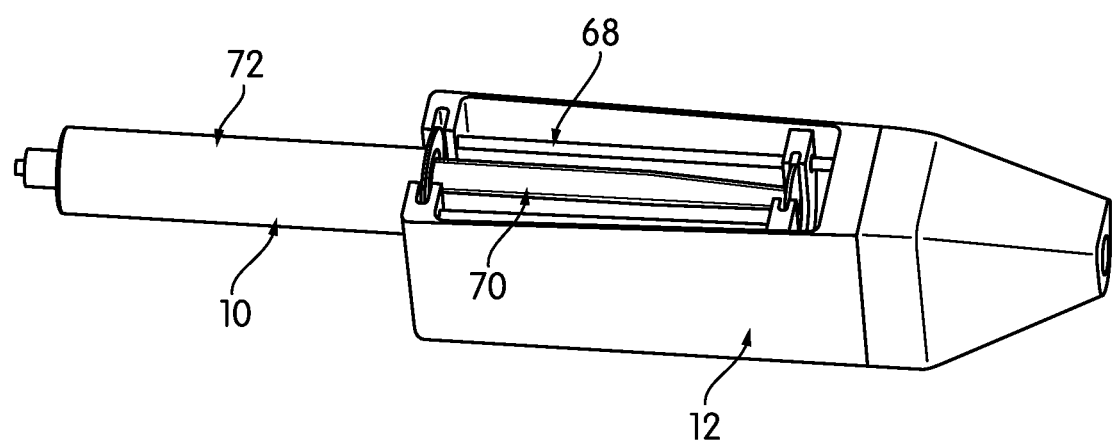
FIG. 1 illustrates a perspective view of a syringe pump according to an exemplary embodiment of the present invention.

Different ones of the Figures may have at least some reference numerals that are the same in order to identify the same components, although a detailed description of each such component may not be provided below with respect to each Figure shown in the diagrams.

DETAILED DESCRIPTION OF THE INVENTION

In accordance with example aspects described herein a device is provided for expressing irrigant into a root canal for root canal therapy, the device comprising a syringe mounting part, a slider, and a connection for an endodontic motor.

Syringe Dispenser

FIG. 1 illustrates a syringe dispenser 12 used in endodontic procedures, and which may be constructed and operated in accordance with at least one example embodiment herein. The syringe dispenser as shown in FIG. 1 and FIGS. 2-5 may comprise a lower housing 16 having a syringe mounting part 68 and an upper housing 26 constructed to enclose a motor coupling 20. The lower housing 16 may have an opening at a top portion to expose the syringe mounting part 68 (or may have a door 84 to enclose the syringe mountain part 68 as shown in FIG. 3), wherein the syringe mounting part 68 may include a slider 24 constructed to engage a plunger 70 of a syringe 10 positioned inside a barrel 72 of the syringe 10, the slider 24 also being connected to guide rods 32 for guiding a movement of the slider 24 and a threaded screw 40, FIG. 4 (e.g. threaded lead screw) for moving said slider 24 forwards and backwards such that said plunger 70 moves forwards and backwards correspondingly. The threaded screw 40 may be configured to have a predetermined diameter of the rod and thread form to determine a speed of the slider 24.

The upper housing 26 and lower housing 16 may be produced by injection molding from materials such as polypropylene, polyethylene, nylon, polycarbonate, Acrylonitrile butadiene styrene (ABS), etc. and may be connected to each other by a connection means (e.g. screws 44).

Figure 2:
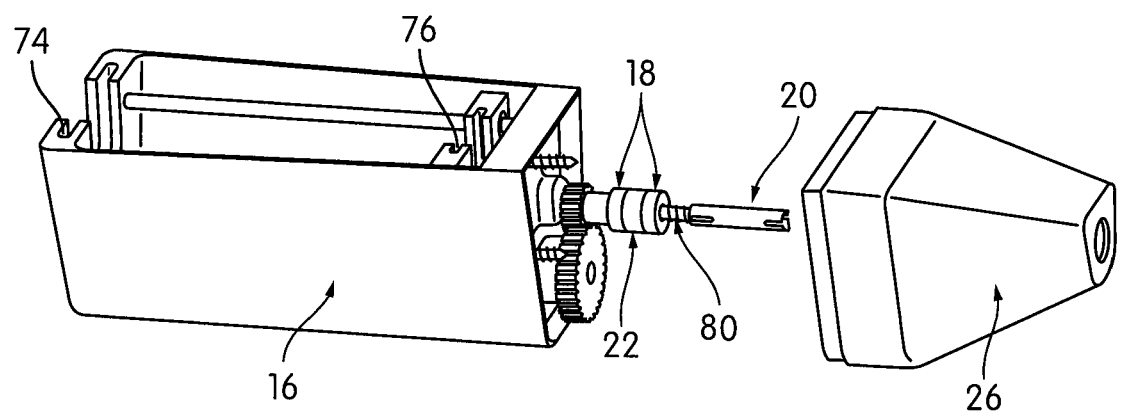
FIG. 2 is an exploded view of a syringe pump illustrating a motor drive.
Figure 3:
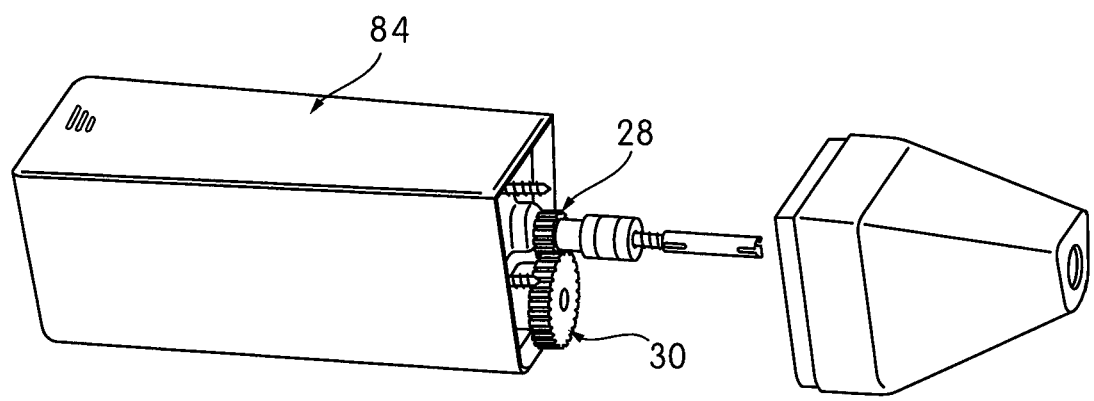
FIG. 3 is an exploded view of a syringe pump having a door for a syringe mounting part and illustrating gears of the syringe pump.
Figure 4:
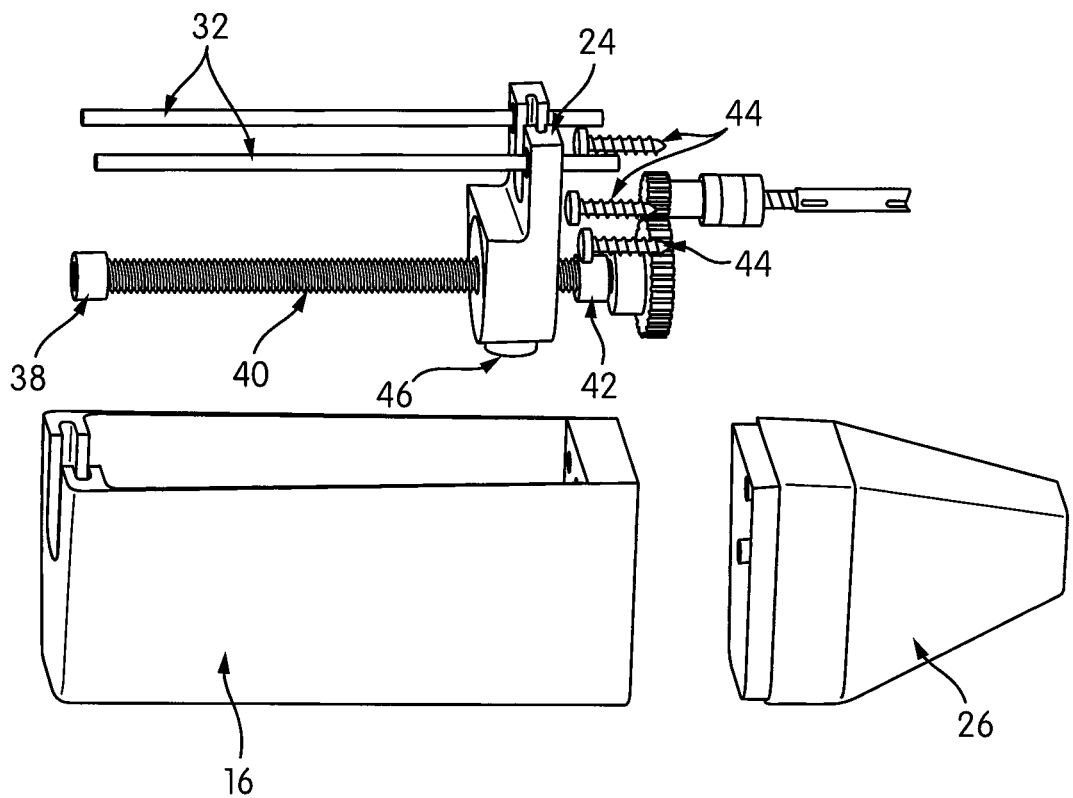
FIG. 4 is an exploded view of a syringe pump showing a syringe drive mechanism.
Figure 5:
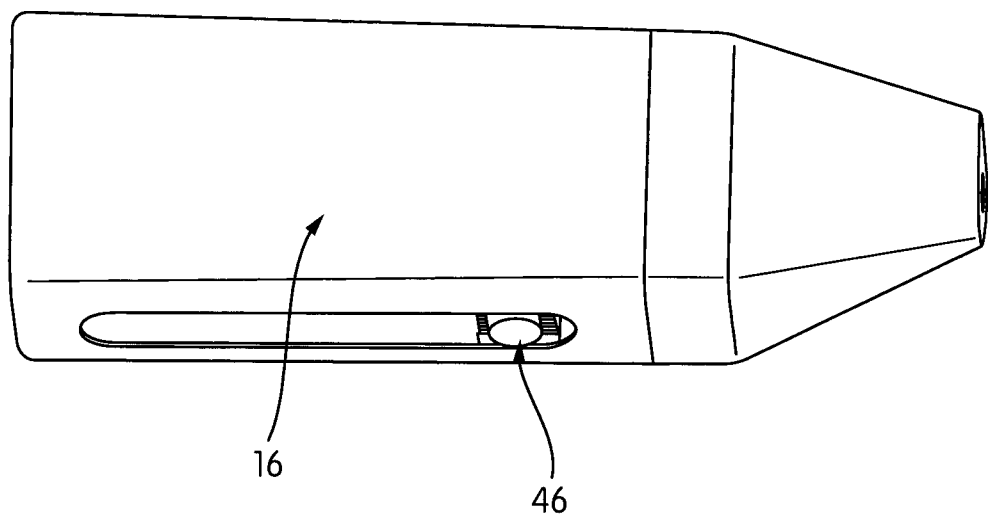
FIG. 5 is a perspective view of an embodiment of the present invention showing a push button slide.
Figure 15:
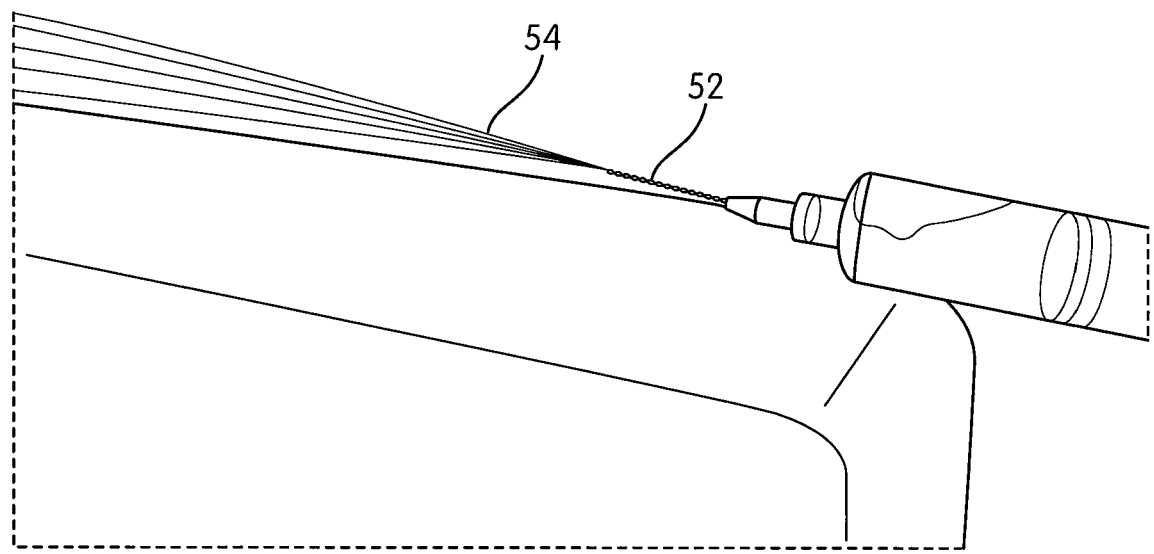
FIG. 15 illustrates a perspective view of a syringe with an irrigant being expressed from the syringe.
Figure 18:
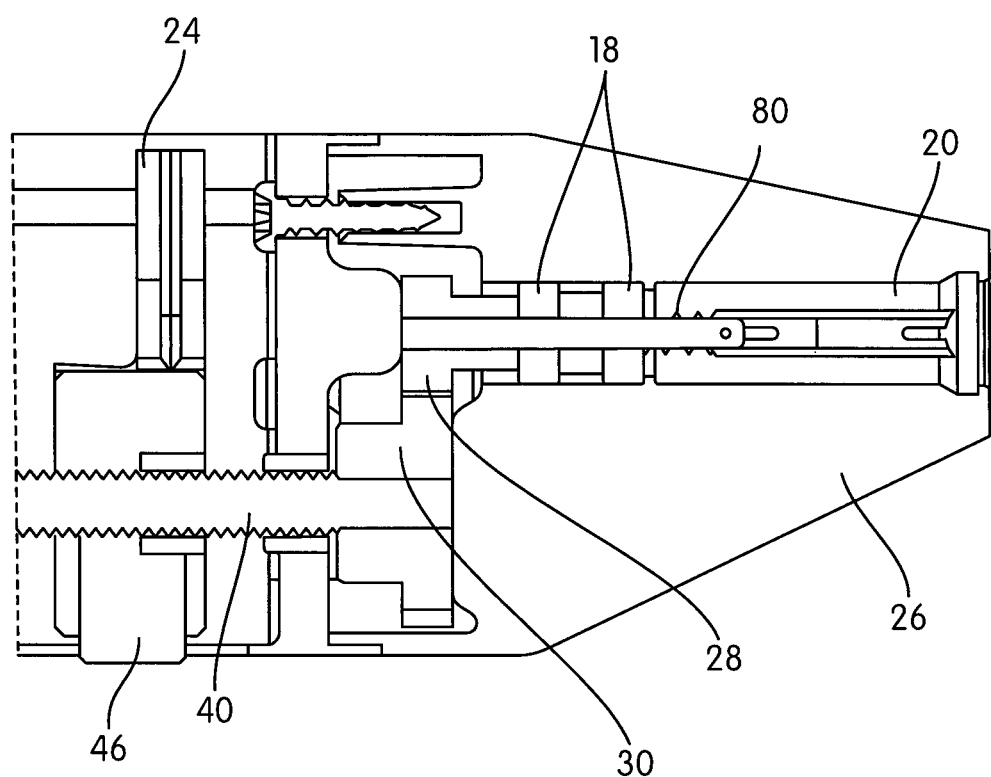
FIG. 18 is a cross section showing the motor coupling in connection with a threaded screw.

As shown in FIGS. 2-4, the motor coupling 20 may be configured to engage endodontic motors (e.g, standard endodontic motors), The motor coupling 20 may be centered within the upper housing 26 and may have bearings 18, a bearing spacer 22 (spacer between the bearings) and a compression spring 80 (FIG. 2, 18) constructed to provide alignment of a high gear 28 connected in alignment with the motor coupling 20, i.e, the motor coupling 20 may be designed per, for example, ISO 3964 (Dentistry—Coupling dimensions for handpiece connectors). The motor coupling 20, when engaged with an endodontic motor 48, may be rotated having the bearings 18 and/or spacer 22 maintaining an alignment of the rotation between the high gear 28 and motor coupling 20. The bearings may be used to provide a friction fit with the inside of the housing so there may be no flexing/lateral movement of the motor coupling 20. As shown in FIG. 18, the compression spring 80 may be used to reduce vibration transfer. The bearings 18 may be configured to provide a friction fit with the inside of the housing so that flexing movement of the motor coupling 20 may be eliminated or substantially eliminated. The high gear 28 may engage with a low gear 30 such that a resultant ratio between the high gear 28 and low gear 30 allows for a preferably increased torque in depressing the syringe 10 compared to if there are no gearings and the endodontic motor 48 is connected directly to the threaded screw 40. The ratio between the high gear 28 and the low gear 30 may be optimized for different motor speeds, as well as for pre-programmed torque control limits on the endodontic motor 48. For example, based on the gear ratio, a motor speed can be set to provide a desired speed of the slider which would then provide a desired flow rate of the irrigant. The low gear 30 may be in connection with the threaded screw 40 such that when the high gear 28 engages with the low gear 30, the threaded screw 40 rotates. The threaded screw 40 may be engaged by its threads to a push button slide 46 attached to the slider 24. As the threaded screw 40 rotates, it may cause the slider 24 to move forwards and backwards thereby causing the plunger 70 of the syringe 10 to move in or out of the syringe barrel 72. By moving the plunger of the syringe, the irrigant 54 within the syringe may be expressed out of the syringe. The syringe 10 may also be connected directly to an irrigation needle 52 (FIG. 15) or to a tubing (not shown) which may then be connected to an irrigation needle via a luer lock connection.

Figure 7:
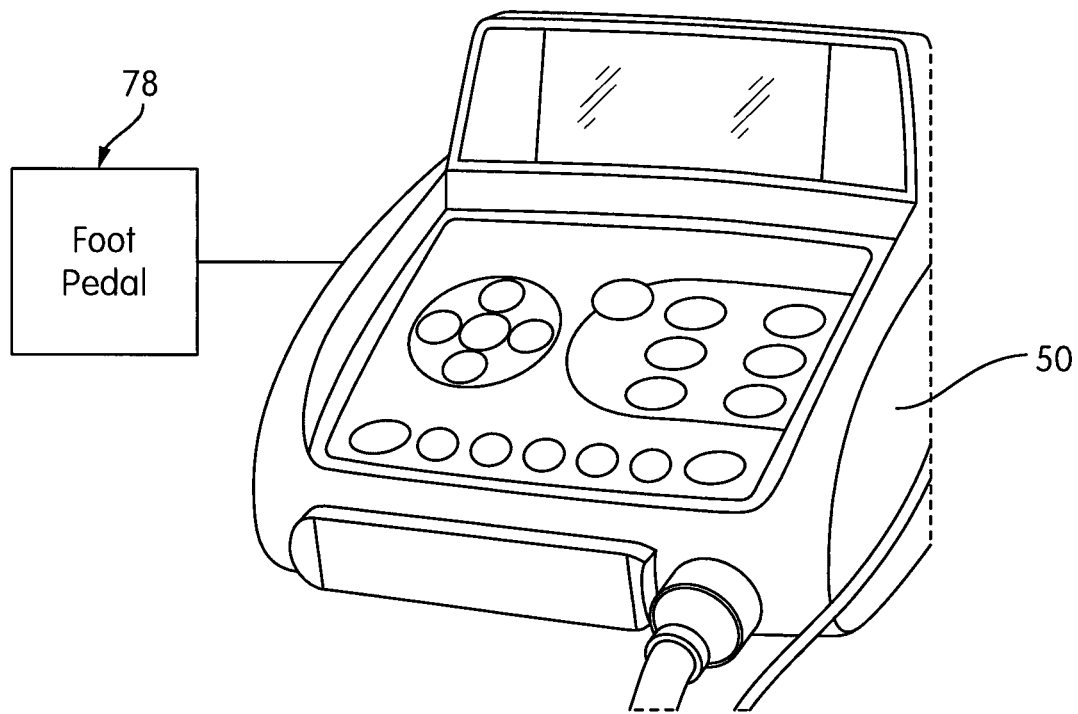
FIG. 7 is a perspective view of an endodontic motor console.
Figure 8:
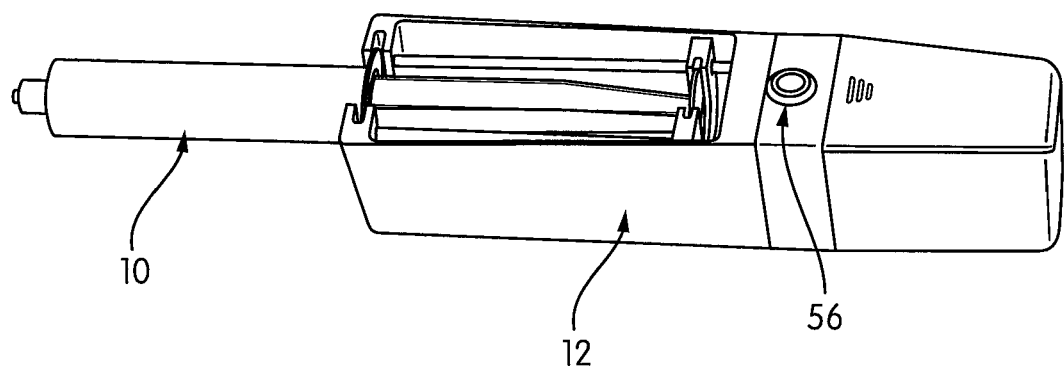
FIG. 8 a perspective view of a syringe pump according to another exemplary embodiment of the present invention.
Figure 9:
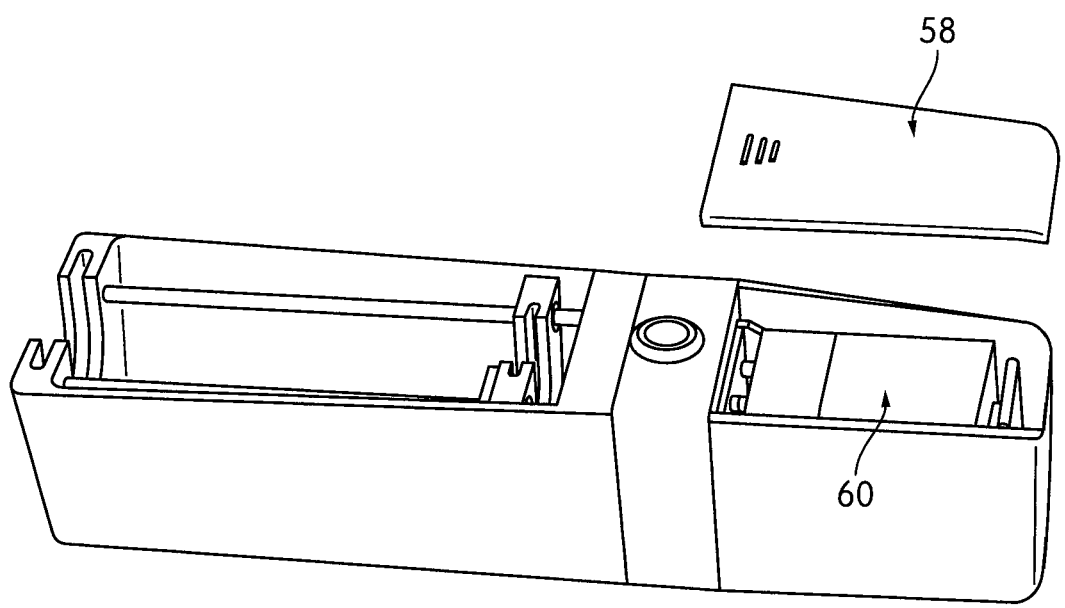
FIG. 9 is a perspective view illustrating a battery housing and battery cover.
Figure 10:
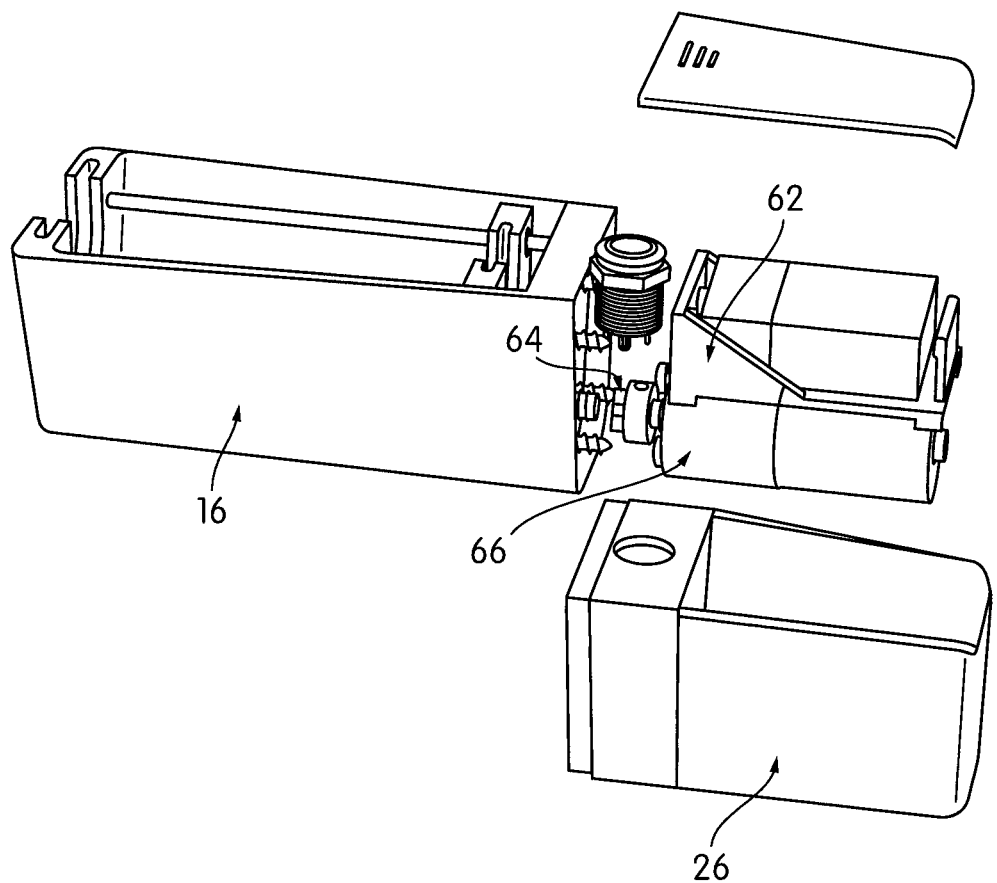
FIG. 10 is an exploded view showing a battery and motor housing according to an exemplary embodiment of the present invention.

As shown in FIG. 1, a loaded syringe 10 filled with irrigant 54 (not shown) may be placed into the syringe dispenser 12 with the plunger 70 engaging a slider slot 76 within the slider 24 and a barrel 72 of the syringe 10 engaging a lower housing slot 74. The user may connect a motor connection of an endodontic motor into the motor coupling 20 inside the syringe dispenser 12. The user may then select a pre-programmed setting on the endodontic motor console 50 (FIG. 7) to determine at what speed/flow rate to express the irrigant. Herein, a user may place an irrigation needle 52 (FIG. 15) connected to the syringe 10 within a root canal (not shown) and activate and/or control the motor with a foot pedal connected to the endodontic motor 48. Further, the syringe dispenser 12 may be configured to be handheld by adapting the dispenser 12 to a shape and/or size that fits the natural profile of a user's hand.

Figure 17A:
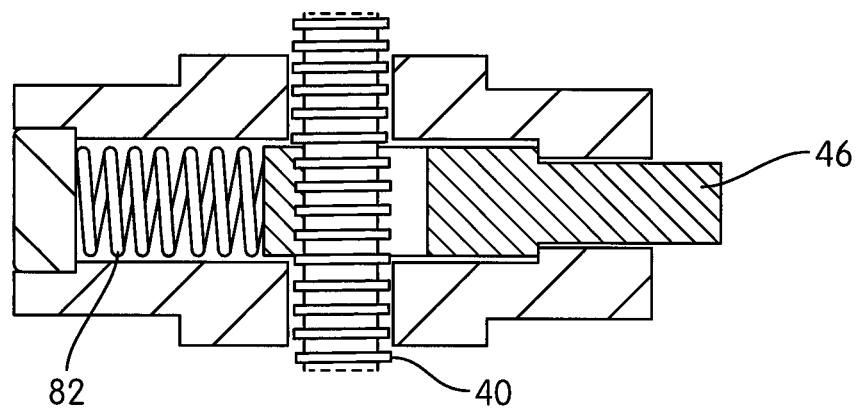
FIG. 17a is a cross section of the push button slide in a first position.
Figure 17B:
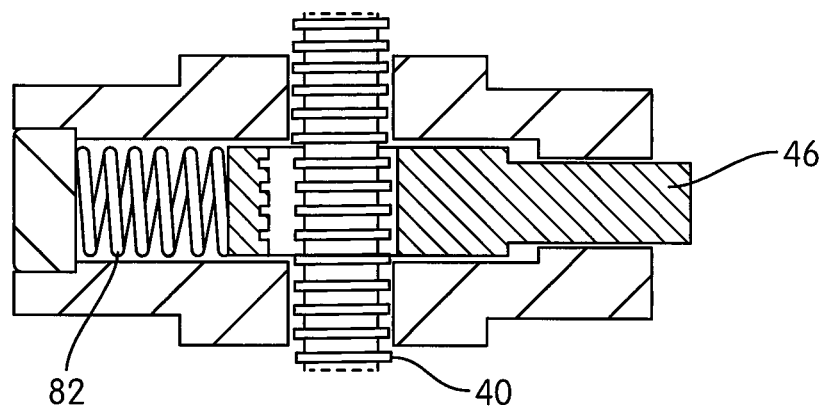
FIG. 17b is a cross section of the push button slide in a second position.

In an exemplary embodiment of the present invention, the dispenser may have a push button slide 46 connected to the slider 24. When the plunger 70 of the syringe 10 has been depressed and the user removes the syringe to refill it, the push button slide 46 may be spring biased with, for example, spring 82 so that the push button slide 46 may be depressed to disengage the threaded screw 40 so that the slider 24 may move or be manually moved forwards or backwards to align it with the plunger 70 of the syringe, as shown in FIGS. 17a and 17b. This may allow for a quicker movement compared to using the endodontic motor 48 to move the slider backwards and/or forwards.

Figure 6:
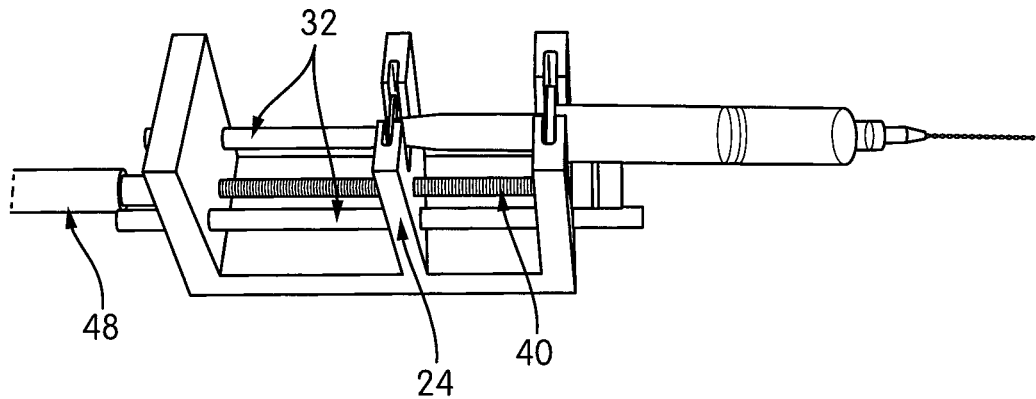
FIG. 6 illustrates a perspective view of a syringe pump connected to an endodontic motor.

FIG. 6 shows internal components of the syringe dispenser 12, demonstrating how the endodontic motor 48 may connect to the syringe dispenser 12. The endodontic motor console 50 (shown in FIG. 7) may have pre-programmed settings that the user may select to express the irrigant 54 at different preferably pre-determined flow rates (based on for example, syringe size, gear ratio used, etc.). Moreover, the pre-programmed settings may have torque control to prevent the syringe pump from becoming damaged once all of the irrigant 52 has been expressed, For example, the torque control may stop the motor 48 from advancing the slider 24 if the torque on the motor 48 exceeds a pre-determined limit. A foot pedal 78 connected to the motor may be used to easily start and stop the motor 48 thereby controlling the syringe dispenser 12. Further, the endodontic motor console 50 may have slots (not shown) that may be used in order to update programs to add more pre-programmed settings. These slots may be in the form of USB ports, SD Card Slots, Wireless, Bluetooth, etc.

Figure 11:
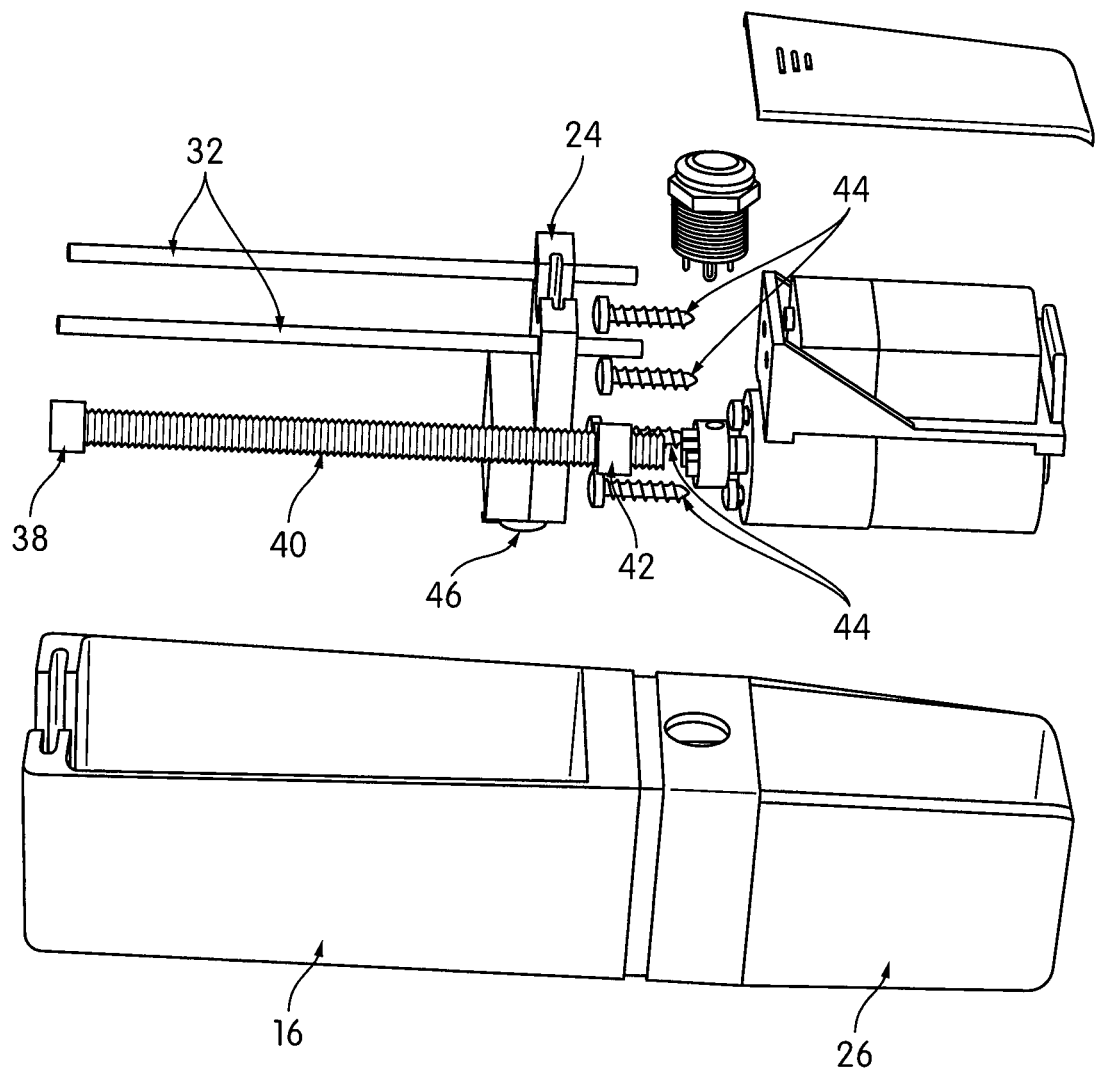
FIG. 11 is an exploded view showing a syringe drive according to an embodiment of the present invention.
Figure 12:
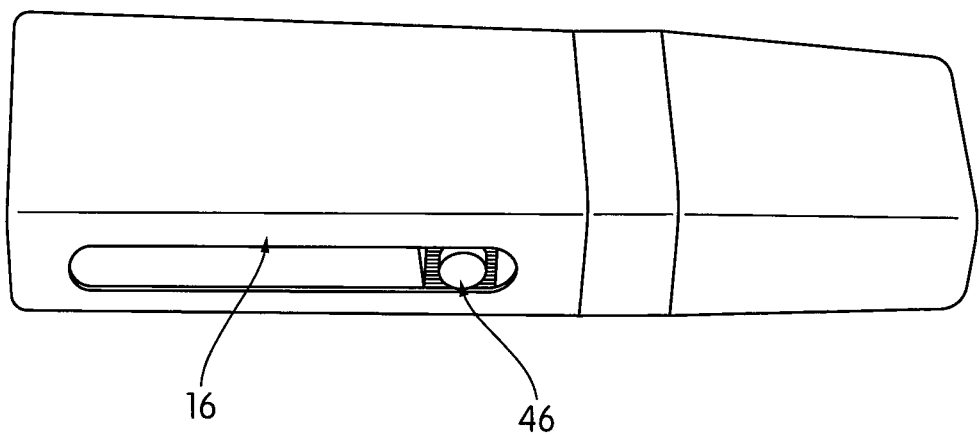
FIG. 12 is a perspective view showing a push button slide according to an embodiment of the present invention.
Figure 13:
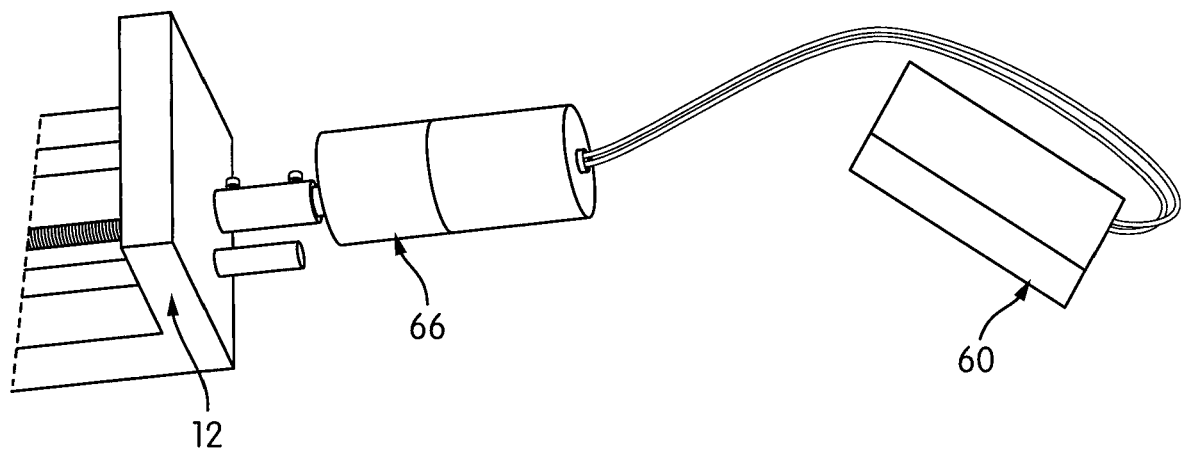
FIG. 13 is a perspective view showing a connection between a syringe pump and a DC motor.
Figure 14:
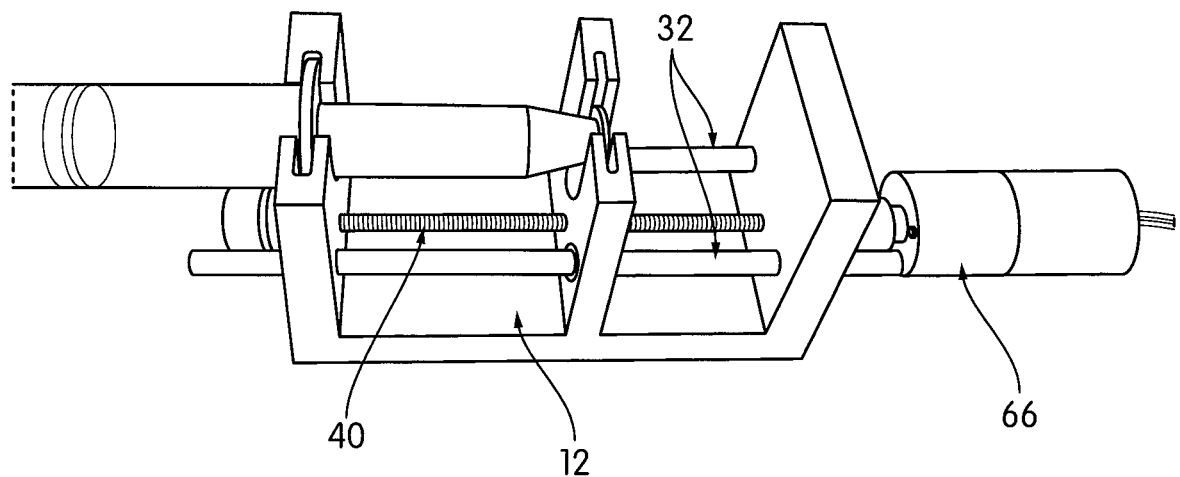
FIG. 14 is another perspective view showing connection between a syringe pump and a DC motor.

In another exemplary embodiment of the present invention, as shown in FIGS. 8-15 the syringe dispenser 12 may be battery powered. Herein, the motor coupling 20 and gears 28, 30 may be replaced by a DC motor 66 (FIG. 10) which may have incorporated into it a gearing system (not shown) configured to increase the torque capability. A battery 60 (e.g. a 9 V DC battery) may be connected to an On/Off Switch 56 which a user may depress to activate the DC Motor 66. The battery 60 may be enclosed along with the DC Motor 66 in the upper housing 26 and a battery cover 58. The DC motor 66 may be connected (for example, directly or indirectly) to the threaded screw 40 as shown in FIG. 11 and FIG. 13-14 which demonstrate internal components of the battery powered syringe dispenser 12.

Figure 16:
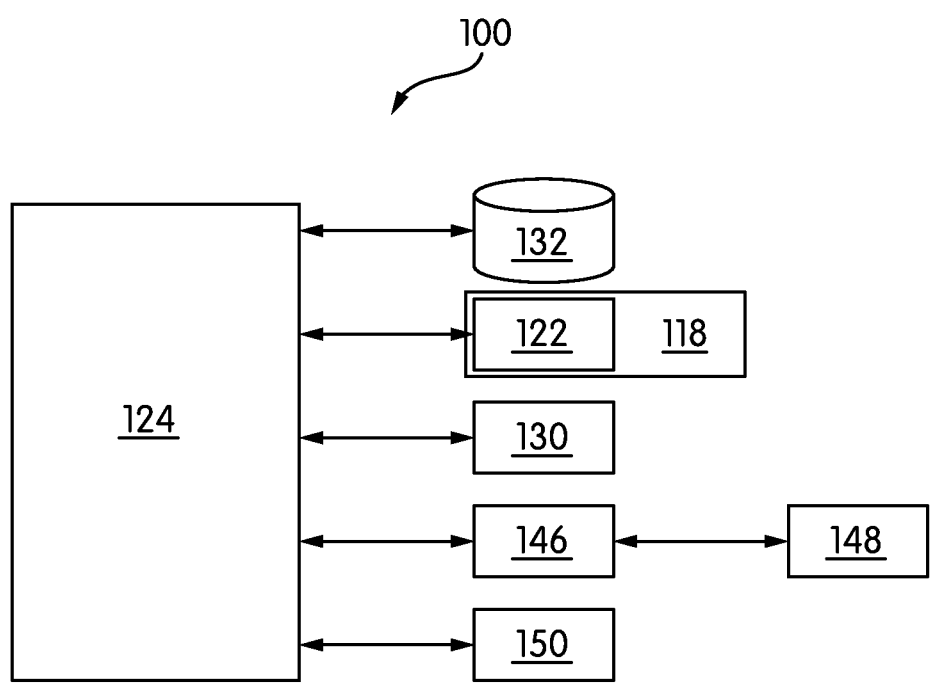
FIG. 16 is a block diagram illustrating a computer system according to an embodiment of the present invention.

Having described a syringe dispenser 12 for expressing irrigant 54 into a root canal for root canal therapy, reference will now be made to FIG. 16, which shows a block diagram of a computer system 100 that may be employed in accordance with at least some of the example embodiments herein. Although various embodiments are described herein in terms of this exemplary computer system 100, after reading this description, it will become apparent to a person skilled in the relevant art(s) how to implement the disclosure using other computer systems and/or architectures of the dental apparatus.

In an exemplary embodiment of the present invention, the syringe dispenser 12 may be adapted to receive a controller 118 comprising a processor 122, and may be connected to a memory 123 via a communication infrastructure 124. The controller 118 may be releasably attached and/or located in the syringe dispenser 12. The controller 118 may also be located outside the syringe dispenser 12, i.e. for example, it may be a controller already inside the endodontic motor console 50 of a standard endodontic motor such as X-SMART® Endo Motor, or may be located inside the syringe dispenser 12, i.e. for example, in the case of a DC powered motor. The controller 118 may connect to the endodontic motor 48 or DC powered motor 66 through one of various communication paths such as through a cable, a wireless interface such as Bluetooth, or any signal transmission interface such as an inductive link that is capable of transmitting and receiving signals.

The controller 118 may be form-fittingly attached to the inside of the housing 16, 26 so that any actuator switch and/or button 56 may be positioned inside the housing 16, 26 for outside access and visibility by means of suitable recesses or windows provided in said housing 16, 26. The controller 118 may include a circuit for control of the endodontic motor 48 or DC powered motor 66. Accordingly, the processor 122 may analyze, for example, pulse width modulated (PWM) signal feedback received from the endodontic motor 48 or DC powered motor 66 and electronically control power supplied to the motor. The computer system 100 may also have a memory 132 for storing data. In one exemplary embodiment of the present invention motor settings may be adjusted through communication between the foot pedal, endodontic motor console 50 and signal feedback from the endodontic motor 48. Further, the memory 132 hold speed and/or torque data including maximum torque for operation of the endodontic motor 48 or DC powered motor 66 by the controller 118. Other data may be stored by the user through an input unit 130, such as a touchscreen display or keypad in connection with the processor 122. Said data may include, inter alia, syringe size, needle size and desired irrigant flow rate. Herein, the controller 118 may control current to the motor based on the stored information such that an appropriate output RPM may be created by the motor to drive the slider 24, and thus plunger 70 of the syringe 10. For example, the smaller the size of the needle, the more torque that may be needed to express the irrigant 52 at a desired flow rate.

The processor 122 may be connected to a communication infrastructure 124 (e.g., a communications bus). The processor 122 may be configured to perform any (or all) of the procedures described herein. To execute a procedure, the processor 122 may load the appropriate instructions, as stored on storage device, into memory 132, and then execute the loaded instructions.

The computer system 100 also may include a communications interface 146 that enables software and data to be transferred between the computer system 100 and external devices such as an iPad. The communications interface 146 may include a network interface (e.g., a Bluetooth interface), and the like. Software and data transferred via the communications interface 146 may be in the form of signals, which may be electronic, electromagnetic, optical or another type of signal that is capable of being transmitted and/or received by the communications interface 146. Signals may be provided to the communications interface 146 via a communications path 148 (e.g., a channel).

One or more computer programs or computer control logic may be stored in the memory 132. The computer programs may also be received via the communications interface 146. The computer programs include computer-executable instructions which, when executed by the computer processor 122, cause the computer system 100 to perform any or all processes as described herein.

Implementation of such a hardware arrangement so as to perform the functions described herein will be apparent to persons skilled in the relevant art(s) in view of this description.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The disclosure may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

What is claimed is:

1. A syringe dispenser for expressing an irrigant from a syringe which has a plunger movably positioned inside a barrel, the syringe dispenser comprising:
   an upper housing and a lower housing connected to the upper housing, the upper and lower housings sequentially arranged with respect to a syringe plunger orientation;
   a syringe mounting part disposed within the lower housing and configured to receive the barrel so that the syringe is mounted on the syringe mounting part;
   a slider disposed within the lower housing, the slider having a plunger receiving portion configured to receive the plunger when the syringe is mounted on the syringe mounting part, and
   a motor coupling disposed within the upper housing, the upper housing having friction fit bearings and a compression spring, wherein the motor coupling is configured to engage a motor and to transfer an output of the motor to a threaded screw,
   wherein, the slider is connected to (i) one or more guide rods which are configured to confine a movement of the slider to a predetermined path and to (ii) said threaded screw which is configured to be operated by the motor coupling such that the slider moves forwards and backwards and creates a corresponding forwards and backwards movement of the plunger, wherein the forwards movement of the plunger expresses the irrigant from the syringe.

2. The syringe dispenser of claim 1, wherein the motor is a standard endodontic motor.

3. The syringe dispenser of claim 2, wherein a foot pedal connected to the standard endodontic motor is used to activate and/or control the forwards and backwards movement of the slider.

4. The syringe dispenser of claim 1, wherein the upper housing and the lower housing are made from a material selected from the group consisting of polypropylene, polyethylene, nylon, polycarbonate and acrylonitrile butadiene styrene.

5. The syringe dispenser of claim 1, wherein the motor coupling includes a high gear and a low gear, the high gear being connected to the motor and the low gear being connected to the threaded screw, wherein a gear ratio between the high gear and the low gear is configured to produce a predetermined torque ratio for depressing the plunger of the syringe.

6. The syringe dispenser of claim 1, wherein the slider has a push button slide and wherein the push button slide is spring biased such that when the push button slide is depressed, the slider disengages from the threaded screw.

7. A battery powered handheld syringe dispenser for expressing an irrigant from a syringe which has a plunger movably positioned inside a barrel, the syringe dispenser comprising:
   an upper housing and a lower housing connected to the upper housing, the upper and lower housings sequentially arranged with respect to a syringe plunger orientation;
   a syringe mounting part disposed within the lower housing and configured to receive the barrel so that the syringe is mounted on the syringe mounting part;
   a slider disposed within the lower housing, the slider having a plunger receiving portion configured to receive the plunger when the syringe is mounted on the syringe mounting part; and
   a DC motor disposed within the upper housing, wherein the motor is configured to transfer an output of said motor to a threaded screw;
   wherein, the slider is connected to one or more guide rods which are configured to confine a movement of the slider to a predetermined path and the slider engages said threaded screw which is configured to be operated by the motor such that the slider moves forwards and backwards and creates a corresponding forwards and backwards movement of the plunger, wherein the forwards movement of the plunger expresses the irrigant from the syringe, and
   wherein the slider has a push button slide and wherein the push button slide is spring biased such that when the push button slide is depressed, the slider disengages from the threaded screw.

8. The battery powered handheld syringe dispenser of claim 7, further comprising a controller having a circuit configured to control the motor.

9. The battery powered handheld syringe dispenser of claim 8, wherein the controller is configured to receive a signal feedback from the motor and to stop the motor from advancing the slider when a torque on the motor exceeds a predefined limit.

10. The battery powered handheld syringe dispenser of claim 8, wherein the controller is located inside and/or outside the syringe dispenser.

* * * * *